(12) United States Patent
Niki

(10) Patent No.: US 6,381,473 B1
(45) Date of Patent: Apr. 30, 2002

(54) DISTRIBUTED ANTENNA FOR PERSONAL COMMUNICATION SYSTEM

(75) Inventor: Yoshiro Niki, Nagoya (JP)

(73) Assignee: Radio Communication Systems Ltd., Hyogo (JP)

(*) Notice: Subject to any disclaimer, the term of this patent is extended or adjusted under 35 U.S.C. 154(b) by 0 days.

(21) Appl. No.: 09/096,616

(22) Filed: Jun. 12, 1998

(30) Foreign Application Priority Data

| Jun. 12, 1997 | (JP) | ............................................. 9-191755 |
| Jul. 8, 1997 | (JP) | ............................................. 9-218900 |
| Nov. 25, 1997 | (JP) | ............................................. 9-363041 |
| Feb. 25, 1998 | (JP) | ............................................. 10-087883 |
| Mar. 14, 1998 | (JP) | ............................................. 10-106889 |

(51) Int. Cl.[7] ............................................. H04M 1/00
(52) U.S. Cl. ......................... 455/562; 455/561; 455/16; 455/19; 455/20
(58) Field of Search ................................ 455/562, 561, 455/575, 313, 16, 17, 19, 20, 15, 11.1

(56) References Cited

U.S. PATENT DOCUMENTS

| 4,455,682 A | * | 6/1984 | Masters ...................... 455/300 |
| 4,622,438 A | * | 11/1986 | Shimizu et al. ................ 379/63 |
| 5,847,682 A | * | 12/1998 | Ke ............................... 343/752 |
| 5,918,154 A | * | 6/1999 | Beasley ...................... 455/11.1 |

FOREIGN PATENT DOCUMENTS

| EP | 0 522 538 A | | 1/1993 | |
| EP | 0 605 182 A | | 7/1994 | |
| EP | 0605182 | * | 7/1994 | ............ H04B/7/26 |
| FR | 2 710 195 A | | 3/1995 | |
| GB | 2 301 712 A | | 12/1996 | |

* cited by examiner

Primary Examiner—Daniel Hunter
Assistant Examiner—Lana Le
(74) Attorney, Agent, or Firm—Marshall, Gerstein, & Borun

(57) ABSTRACT

A distributed antenna for use in a digital mobile telephone system includes a set of coaxial cable to couple the RF signals to and from a base station in which at least one set of the transmitter and receiver is transmitting and receiving said RF signals, two mutually isolated amplifiers, two dividers, at least one combiner, and at least one built-in antenna to couple with a subscriber unit(s). A printed circuit board is provided to assemble said built-in antenna on one side of said printed circuit board, and to assemble other electronic circuits on another side of said printed circuit board, and said printed circuit board is housed a plastic case. Said distributed antenna provides a small sized and very cheap antenna solution to spread RF signals to serve a wider serving area. Moreover, if at least a set of transmitter and receiver is included in said combiner to repeat said RF signals between said base station and said subscriber units, tremendously higher gain and conversions in the control protocol and/or RF frequencies can be realized.

6 Claims, 5 Drawing Sheets

DISTRIBUTED ANTENNA FOR PERSONAL COMMUNICATION SYSTEM

This invention relates to mobile wireless communications systems and generally to the field of the antenna facilities which include amplification circuits to compensate for the losses generated by connecting the antenna facilities to the base station through coaxial cables, and more specifically, relates to the configurations of the antenna facilities including a printed wire board on which an antenna element and/or electronic circuits are assembled, and the configurations of the combiner to connect said antenna element.

BACKGROUND OF THE INVENTION

Distributed antenna are provided to enhance the service area of a PHS (Personal Handy Phone System) or PCS (Personal Communication System) which service area is sometimes limited by a small power output and obstructions such as walls and/or ceilings that block RF signals, and to distribute the RF signals for ensuring of small in size and economical solutions.

U.S. patent application Ser. No. 08/546,842 of Y. Niki, assigned to the same assignee as here, discloses several embodiments of a duplex RF repeater, having an amplifier in various configurations for receiving, amplifying, and re-transmitting down-link signals from a base station into an obstructed area, and also for receiving up-link signals from subscriber units in the obstructed area, amplifying them and re-transmitting the amplified signals to the base station. In one embodiment disclosed in that patent, an up-link amplifier and a down-link amplifier, and an isolation means between them that receive both up-link and down-link signals from a base station, amplify these signals, and retransmit these signals through divider means into downstream antenna means and RF transmission cable means communicating with the next stage of the duplex RF repeater.

Problems may arise with the above described duplex RF repeater when applied for installation in actual personal communication systems. Since the downstream antenna must be installed separately from the main-box of the duplex RF repeater, connectors and connection cables are needed, and this increases the total cost of the systems

SUMMARY OF THE INVENTION

The present invention provides a new and improved apparatus for amplifying the RF signals to/from a base station to enhance the coverage of the serving area where the obstructions otherwise reduce the RF signal levels, and distributing one or more RF carriers assigned for the personal communications system into a plurality of the microcell service area to achieve economical installation cost.

In brief summary, antenna means and other electronic circuits are assembled on a printed circuit board and said printed circuit board is covered with a plastic case and partially by a metal shielding case. Combiner means are provided to adopt a built-in common antenna element.

In one embodiment, antenna means and other electronic circuits are assemble on a printed circuit board, and said printed circuit board is housed in a plastic case and partially covered by a metal shield.

In a second embodiment, the combiner means is constructed by a circulator, divider, directional coupler, and/or electronic switch to connect a common antenna means to receive and re-transmit the RF signals to/from subscriber units within a serving area.

In a third embodiment, the combiner means include a digital transceivers to connect common antenna means by repeating the RF signals and converting the protocol and/or frequencies of said RF signals.

BRIEF DESCRIPTION OF THE DRAWING

The invention is point out particularly in the appended claims. The above and further advantages of the invention will be better understood by referring to the following detailed descriptions of an illustrative embodiment taken in conjunction with the accompanying drawings, in which:

DETAILED DESCRIPTION OF AN ILLUSTRATIVE EMBODIMENT

Figure 10:
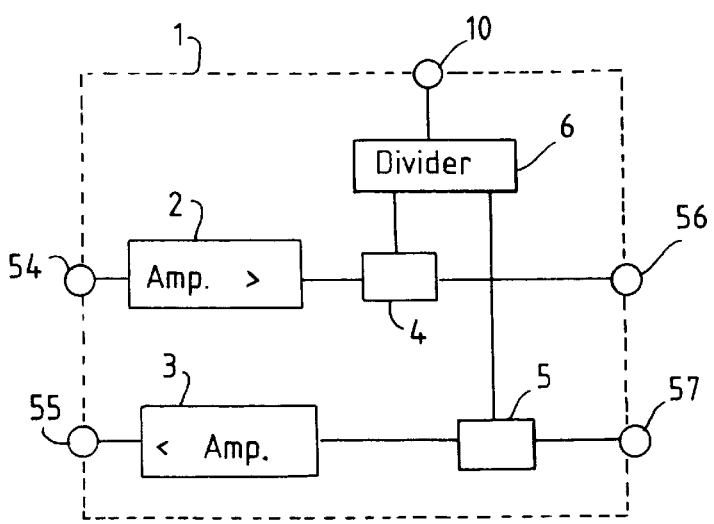
FIG. 10 is a block diagram of a prior duplex RF repeater system.

With reference to FIG. 10, there is illustrated a prior duplex RF repeater 1 as described in the aforementioned U.S. patent application Ser. No. 08,546,842. In the Duplex RF Repeater 1, the down-link RF signals coupled to the terminal 54 are amplified by the down-link amplifier 2, and then said amplified RF signals are divided into two directions by the divider 4 coupled to the divider 6, and in another direction the divider 4 is connected to the terminal 56. On the other hand, the up-link RF signals coupled to the terminal 57 are combined with the RF signals coupled from the divider 6 by the divider 5, and then amplified by the up-link amplifier 3 and then coupled to the terminal 55. At the terminal 10 of the divider 6, a downstream antenna can be connected to serve subscriber units within the service area. In this scheme, it is not cost effective because the downstream antenna must be connected separately through a coaxial cable, and as the result, the dimensions of the duplex RF repeater are large sized.

Figure 1:
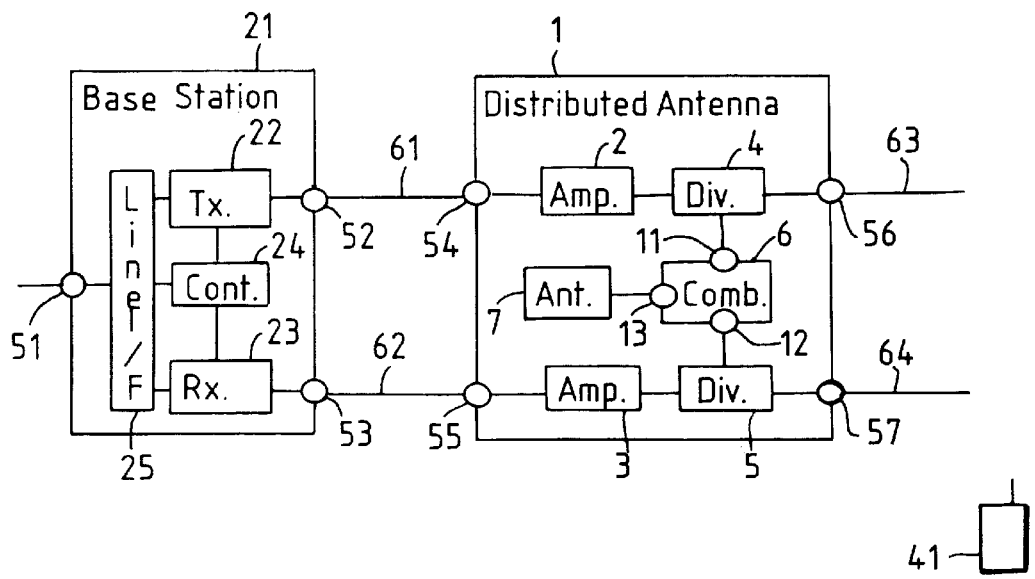
FIG. 1 is a system block diagram including a distributed antenna constructed in accordance with the invention.

With reference to FIG. 1, the RF signals from the transmitter 22 of the base station 21 are coupled to the terminal 54 of the distributed antenna 1 through the terminal 52 and the coaxial cable 61. The receiver 23 of the base station 21 is coupled to the terminal 55 of said distributed antenna 1 through the terminal 53 and the coaxial cable 62. Said transmitter 22 and receiver 23 of the base station 21 are controlled by the controller 24, and coupled to the telephone lines through the interface unit 25 and terminal 51. In said distributed antenna 1, the down-link amplifier 2 amplifies the down-link RF signals, and these signals are coupled to the divider 4 and then one of the divided directions of the divider 4 are coupled to the built-in common antenna element 7 through combiner 6, and these signals are radiated from said antenna element 7. Another divided direction of the divider 4 is coupled to the terminal 56. Since the amplifier gain of the amplifier 2 is adjusted to match with the total loss of the coaxial cable 61 and divider 4 and combiner 6, not only the radiated power from said antenna element 7 but also the output power from the terminal 56 to the next stage of said distributed antenna are almost the same magnitude with the power output from the transmitter 22 of the base station 21. On the other hand, the RF signals transmitted from the subscriber unit 41 is received by said antenna element 7 first, and coupled to the up-link amplifier 3 through the terminal 13 and combiner 6 and divider 5. These amplified signals further coupled to the receiver 23 of the base station 21 through the coaxial cable 62 and terminal 53. Another direction of the divider 5 is coupled to the receiver 23 of the base station 21 through the coaxial cable 62 and terminal 53. Another direction of the divider 5 is coupled to the terminal 57 to connect the next stage of said distributed antenna. Since the amplifier 3 compensates the losses caused by the coaxial cable 62, these signals transmitted from the subscriber unit 41 are received by the receiver 23 with high sensitivity.

Figure 2:
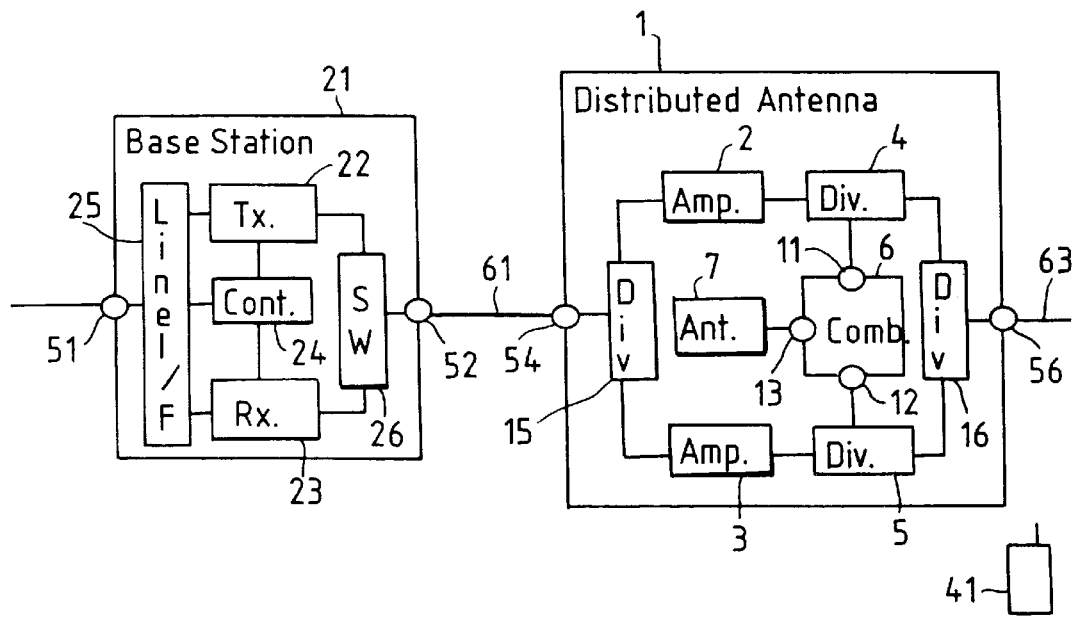
FIG. 2 is another system block diagram including a distributed antenna constructed in accordance with the invention.

With reference to FIG. 2, the distributed antenna 1 constructed in accordance with this invention is coupled to the terminal 52 of the base station 21 through the terminal 54 and the coaxial cable 61. Said terminal 52 is further coupled to the receiver 23 and transmitter 22 of said base station 21 through the antenna switch 26. Said transmitter 22 and receiver 23 of said base station 21 are controlled by the controller 24, and coupled to the telephone lines through the interface unit 25 and terminal 51. In said distributed antenna 1, the divider 15 divides said RF signals and couples the down-link amplifier 2 and up-link amplifier 3. The down-link amplifier 2 amplifies the down-link RF signals, and these signals are coupled to the divider 4 and then one of the divided directions of the divider 4 are coupled to the built-in common antenna element 7 through combiner 6, and said RF signals are radiated from said antenna element 7. Another divided direction of the divider 4 is coupled to the terminal 56 through the divider 16 to connect the coaxial cable 63. Since the amplifier gain of the amplifier 2 is adjusted to match with the total loss of the coaxial cable 61, and divider 15 and 4, and combiner 6, not only the radiated power from said antenna element 7 but also the output power from the terminal 56 to the next stage of said distributed antenna are almost the same magnitude with the power output the transmitter 22 of the said base station 21.

On the other hand, the RF signals transmitted from the subscriber unit 41 is received by said antenna element 7 first, and coupled to the up-link amplifier 3 through the terminal 13 and combiner 6 and divider 5. These amplified signals further coupled to the receiver 23 of said base station 21 through the divider 15, terminal 54, coaxial cable 61, terminal 52, and antenna switch 26. Another direction of the divider 5 is coupled to the terminal 56 through divider 16 to connect the next stage of said distributed antenna. Since the amplifier 3 compensates the losses caused by the divider 15, coaxial cable 61, said RF signals transmitted from the subscriber unit 41 are received by the receiver 23 with high sensitivity.

Figure 3:
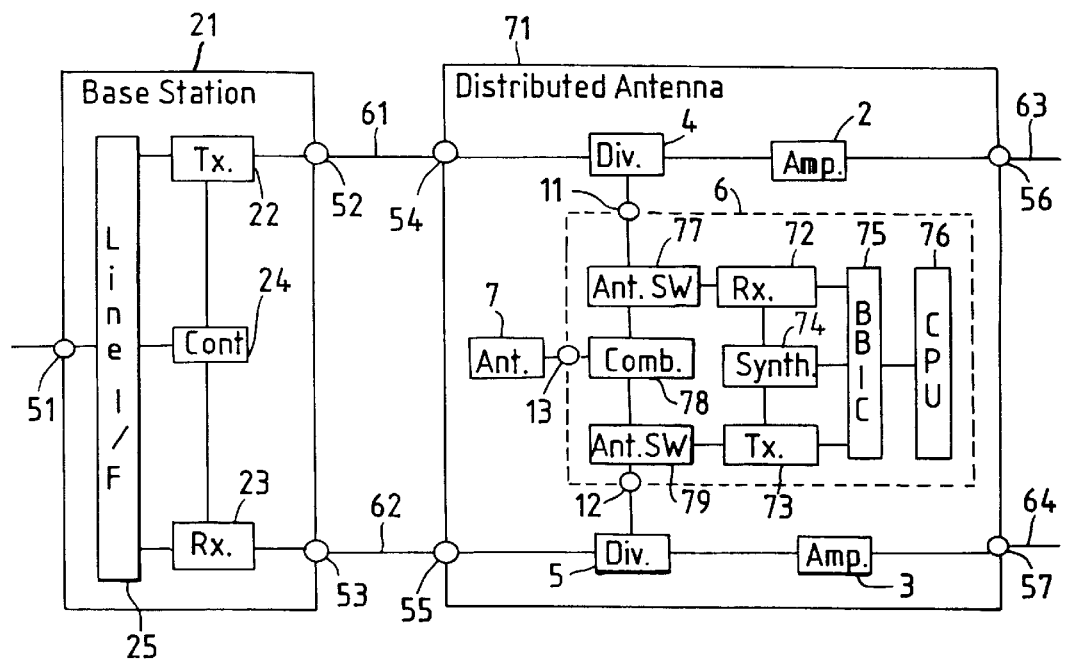
FIG. 3 is another system block diagram including a distributed antenna constructed in accordance with the invention.

With reference to FIG. 3, the distributed antenna 71 constructed in accordance with this invention is coupled to the transmitter 22 of the base station 21 through a coaxial cable 61 and the terminal 52 and to the receiver 23 of the base station 21 through a coaxial cable 62 and the terminal 53. Said transmitter 22 and receiver 23 are controlled by the control unit 24 and connected to the telephone line through the telephone line interface unit 25 and the terminal 51.

Within said distributed antenna 71, the down-link RF signals are divided into two directions by the divider 4. One direction of said divider 4 is further coupled to the antenna switch 77 in the combiner 6 through the terminal 11, and switched to the receiver 72. Said receiver 72 converts said RF signals into the base band signals and said transmitter 73 modulates them into new RF signals by adapting said base band signals between said receiver 72 and said transmitter 73 in the TDMA (Time Division Multiple Access) repeater mode or CDMA (Code Division Multiple Access) repeater mode through the base band IC 75. Said modulated RF signals are further coupled to the built-in antenna 7 through the built-in combiner 78 and terminal 13, and radiated toward a subscriber unit 41. RF signals from another direction of said divider 4 are amplified by the amplifier 2 and coupled to the next stage of said distributed antenna 1 through a terminal 56 and a coaxial cable 63.

On the other hand, RF signals from a subscriber unit 41 are received by said built-in antenna 7, and coupled to the antenna switch 77 through a terminal 13 and a built-in combiner 78, and switched to the receiver 72, and then said receiver 72 detects said RF signals into the base band signals and transmitter 73 modulates them into another new RF signals again by interconnecting said base band signals between said receiver 72 and said transmitter 73 in the TDMA repeater mode or CDMA repeater mode through the base band IC 75, and coupled to the divider 5 through the antenna switch 79 and terminal 12 and further communicated with the receiver 23 of the base station 21 through the terminal 55, coaxial cable 62, and terminal 53. The up-link amplifier 3 amplifies the RF signals from the terminal 57, and coupled to the another direction of the divider 5.

In the above, the synthesizer 74 supplies a local RF signals to the receiver 72, transmitter 73, and the controller 76 controls the base band IC 75, receiver 72, and antenna switch 77 and 79. By these configurations, distance between distributed antenna can be extended tremendously.

Figure 4:
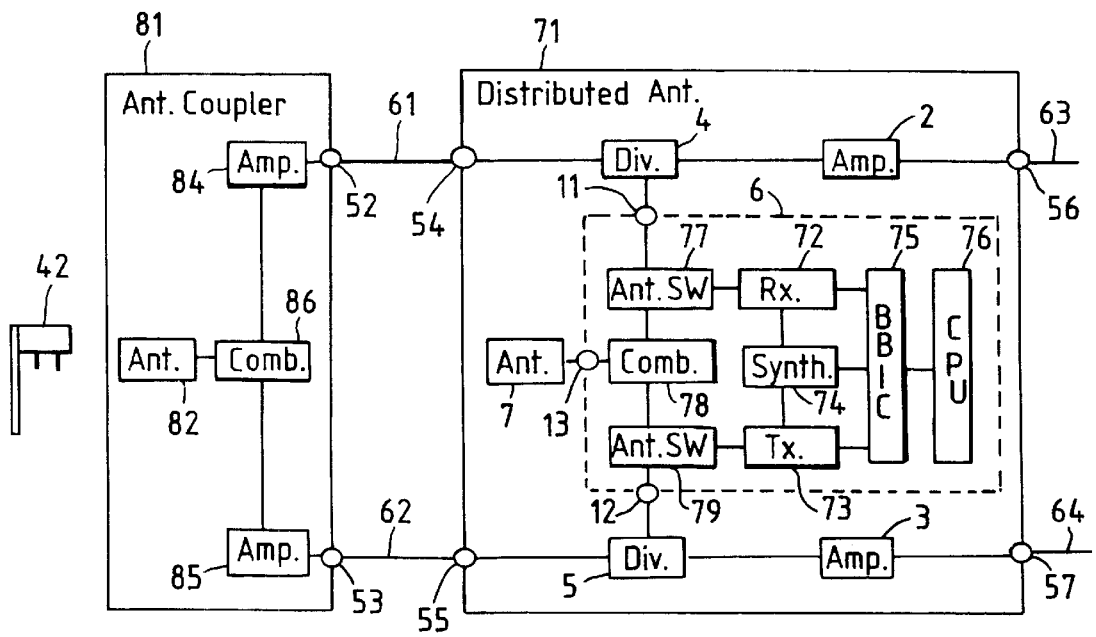
FIG. 4 is another system block diagram including a distributed antenna constructed in accordance with the invention.

With reference to FIG. 4, the antenna coupler 81 constructed in accordance with this invention is coupled to the external base station 42 with the antenna 82. The down-link RF signals from said base station 42 are received by the antenna 82 and coupled to and amplified by the down-link amplifier 84, and coupled to the distributed antenna 71 at the terminal 54 through the terminal 52 and coaxial cable 61, and transmitted toward a subscriber unit 41 as described in FIG. 3 above.

On the other hand, the up-link RF signals at the terminal 55, which are transmitted from a subscriber unit 41 and amplified by said distributed antenna 1 as described above in FIG. 3, are coupled to and amplified by the up-link amplifier 85 through the coaxial cable 62 and terminal 53, and said amplified up-link RF signals are coupled to said base station 42 through the combiner 86 and antenna 82.

Figure 5:
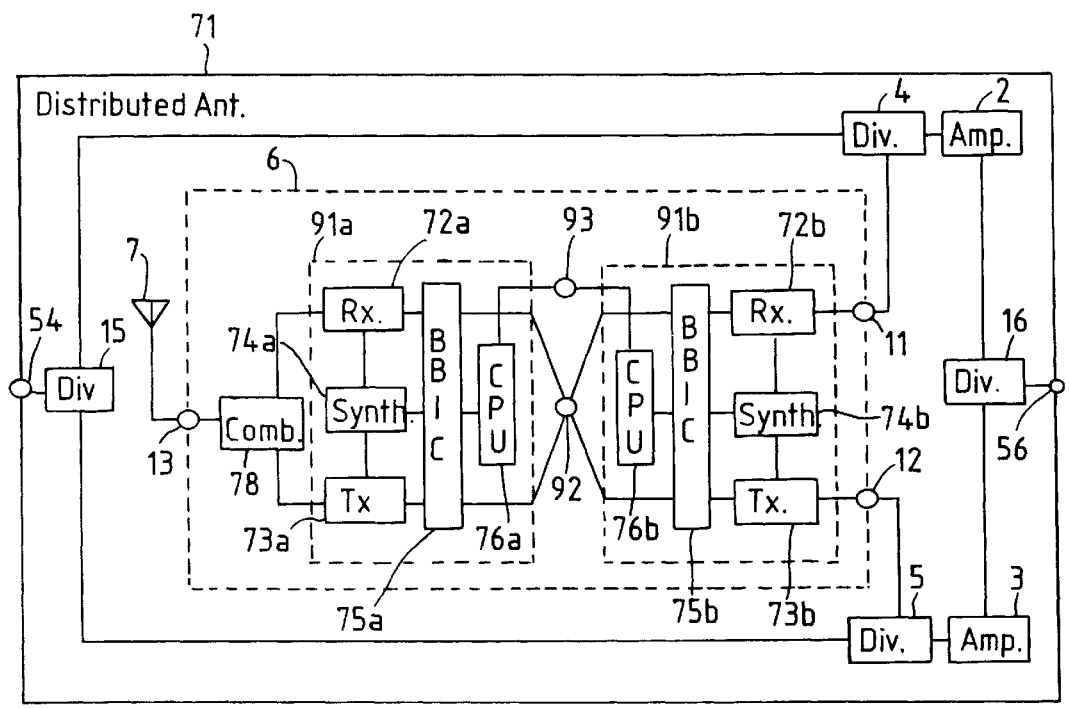
FIG. 5 is a block diagram of a distributed antenna constructed in accordance with the invention.

With reference to FIG. 5, another type of the distributed antenna 71 constructed in accordance with this invention includes another type of the combiner 6, in which the first transceiver 91*b* and the second transceiver 91*a* are provided and interconnected between them by the cascade connection. Within said distributed antenna 71, the RF signals coupled to the terminal 54 are divided by the divider 15 into the down-link RF signals and up-link RF signals. Said down-link RF signals are divided by the divider 4 into two directions, and one direction of said divider 4 is coupled to the receiver 72b in the combiner 6 through the terminal 11, and said receiver 72b converts said RF signals into the base band signals and the transmitter 73a modulates them into other RF signals again by interconnecting said base band signals in the FDMA (Frequency Division Multiple Access) or Cascade Connection repeater mode between said receiver 72b and transmitter 73a through the base band IC 75b and 75a. Said modulated RF signals are further coupled to the built-in antenna 7 through the built-in combiner 78 and terminal 13, and radiated toward a subscriber unit 41. Said RF signals from another direction of said divider 4 are amplified by the amplifier 2 and coupled to the next stage of said distributed antenna 1 through a terminal 56.

On the other hand, RF signals from a subscriber unit 41 are received by said built-in antenna 7, and coupled to the receiver 72a through a terminal 13 and a built-in antenna 7, and coupled to the receiver 72a through a terminal 13 and a built-in combiner 78, and said receiver 72a converts said RF signals into the base band signals, and the transmitter 73b modulates said base band signals into other RF signals again by adapting said base band signals in the FDMA or Cascade connection repeater mode between said receiver 72a and said transmitter 73b through the base band IC 75a and 75b, and coupled to one of the directions of the divider 5 through the terminal 12, and coupled toward the terminal 54. The up-link amplifier 3 amplifies the RF signals from the terminal 54, and coupled to another direction of the divider 5.

Figure 6:
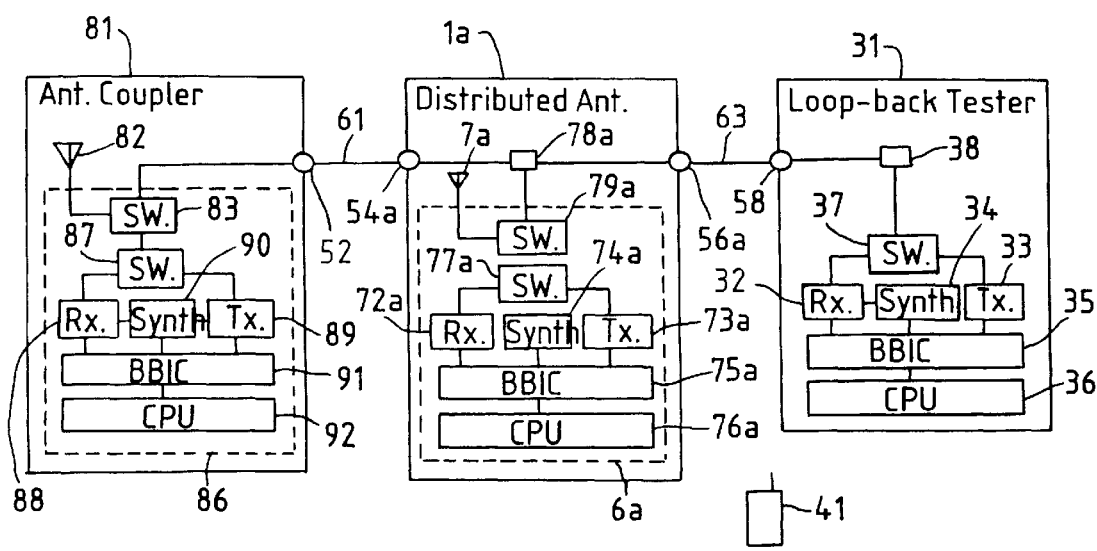
FIG. 6 is another system block diagram including an antenna coupler, a distributed antenna, and a loop back tester constructed in accordance with the invention.

With reference to FIG. 6, another type of the antenna coupler 81, distributed antenna 71, and a loop-back tester 31 constructed in accordance with this invention are depicted Said distributed antenna 71 is coupled to said antenna coupler 81 at the terminal 54a through a coaxial cable 61, and said loop-back tester 31 is further coupled to said distributed antenna 71a at the terminal 58 through a coaxial cable 63.

At the antenna coupler 81, a built-in antenna 82 receives the down-link RF signals transmitted from a base station through an antenna coupler 81, and fed to the receiver 88 through antenna switch 83 and 87. Said receiver 88 converts said RF signals into the base band signals, and said base band signals are interconnected to the transmitter 89 through the base band IC 91 and controller 92, and modulated into new down-link RF signals, and transmitted toward the distributed antenna 71a through antenna switches 87 and 83, and the coaxial cable 61.

At the distributed antenna 71a, a divider 78a feeds said down-link RF signals transmitted from said antenna coupler 81 to the receiver 72a through antenna switches 79a and 77a. Said receiver 72a converts said RF signals into the base band signals, and said base band signals are interconnected to the transmitter 73a through the base band IC 75a and controller 76a, and said base band signals are modulated into new down-link RF signals, and re-transmitted toward the subscriber unit 41 through antenna switches 77a and 79a, and the built-in antenna 7a.

At the loop-back tester 31, the down-link RF signals from said antenna coupler 81 are fed to the receiver 32 through the coaxial cable 63, the attenuator 38 and the antenna switch 37 and detected into the base band signals, and coupled to the base band IC 35 and controller 36. Said controller 36 is further detecting the control signals included within said base band signals. If the loop-back test command is included within said base band signals, said controller 36 sends back a loop-back answering command to said transmitter 33. Said transmitter 33 sends back said command toward the base station through said antenna switch 37, attenuator 38, coaxial cable 63, and the distributed antenna 71a. If the loss of the attenuator 38 are adjusted in the limit, said antenna coupler 81, and said distributed antenna 71a can be checked including gains and functions. The synthesizers 90, 74a, and 34 are generating local RF signals and feed said RF signals into transmitters 89, 73a, and 33, and receivers 88, 72a, and 32.

On the other hand, the up-link RF signals transmitted from a subscriber unit 41 are received by the built-in antenna 7a. And said up-link RF signals are fed to the receiver 72a through antenna switches 79a and 77a, and detected into the base band signals, and interconnected to the transmitter 73a through said base band IC 75a and controller 76a. Said transmitter 74a modulates said base band signals into new up-link RF signals and re-transmits said RF signals toward said antenna coupler 81 through antenna switches 77a and 79a, said coupler 78a, and said coaxial cable 61. The receiver 88 of said antenna coupler 81 converts said up-link RF signals into the base band signals, and said base band signals are interconnected to the transmitter 89 through the base band IC 91 and controller 92. Said transmitter 89 modulates said base band signals into new up-link RF signals and re-transmits said RF signals toward said base station through antenna switches 87 and 83, and the built-in antenna 82.

If the coupling loss of the coupler 38 are adjusted in the limit, said antenna coupler 81, and said distributed antenna 71a can be checked including gains and functions.

Figure 7:
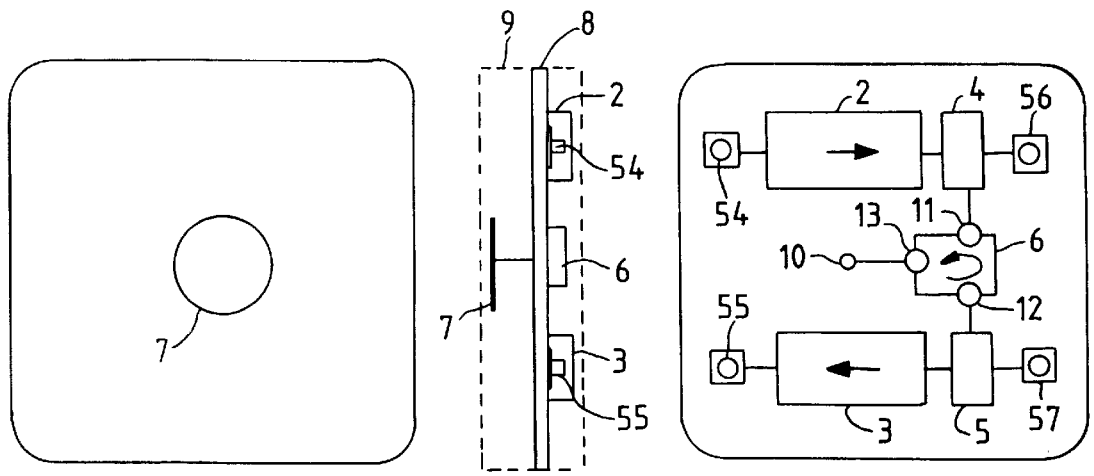
FIG. 7 is a configuration of a distributed antenna constructed in accordance with the invention.

With reference to FIG. 7, a distributed antenna constructed in accordance with this invention is assembled on a single printed circuit board 8, and housed within a plastic case 9 including an RF shielding case to cover the printed circuit board. These terminals 54, 55, 56, and 57, the down-link amplifier 2 and up-link amplifier 3, the dividers 4 and 5, and the built-in combiner 6 are assembled on the one side of said printed circuit board 8. The built-in antenna 7 is assembled on the other side of said printed circuit board 8. Here, said combiner 6 is constructed as a circulator, and said built-in antenna is constructed with a monopole antenna. By the above constructions, a small sized and very cheap omnidirectional distributed antenna can be realized.

Figure 8:
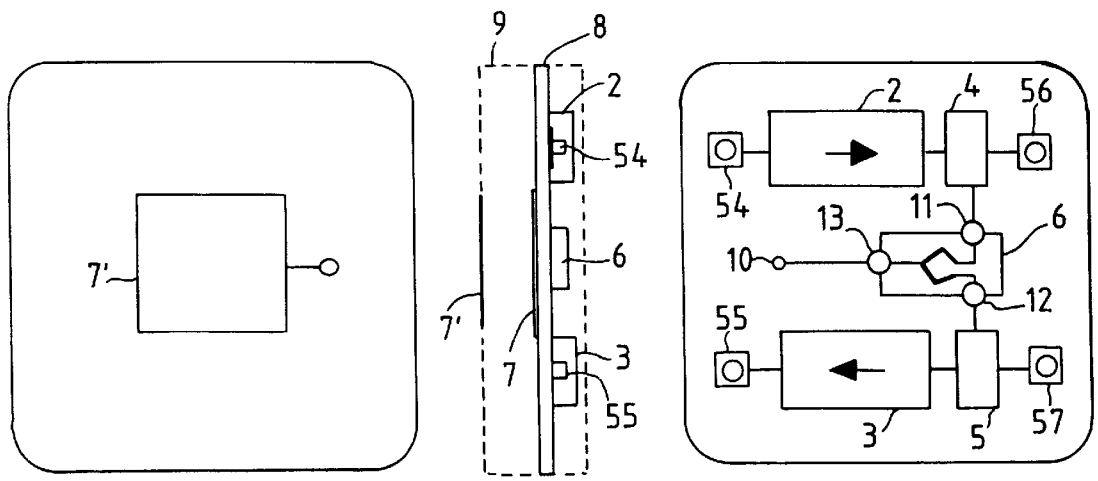
FIG. 8 is another configuration of a distributed antenna constructed in accordance with the invention.

With reference to FIG. 8, another type of the distributed antenna 1 constructed in accordance with this invention is described, and said combiner 6 is constructed by a divider with 3 dB loss, and said built-in antenna if constructed with a patch antenna with radiation element 7'. By the above constructions, a wall mount type directional distributed antenna can be realized.

Figure 9:
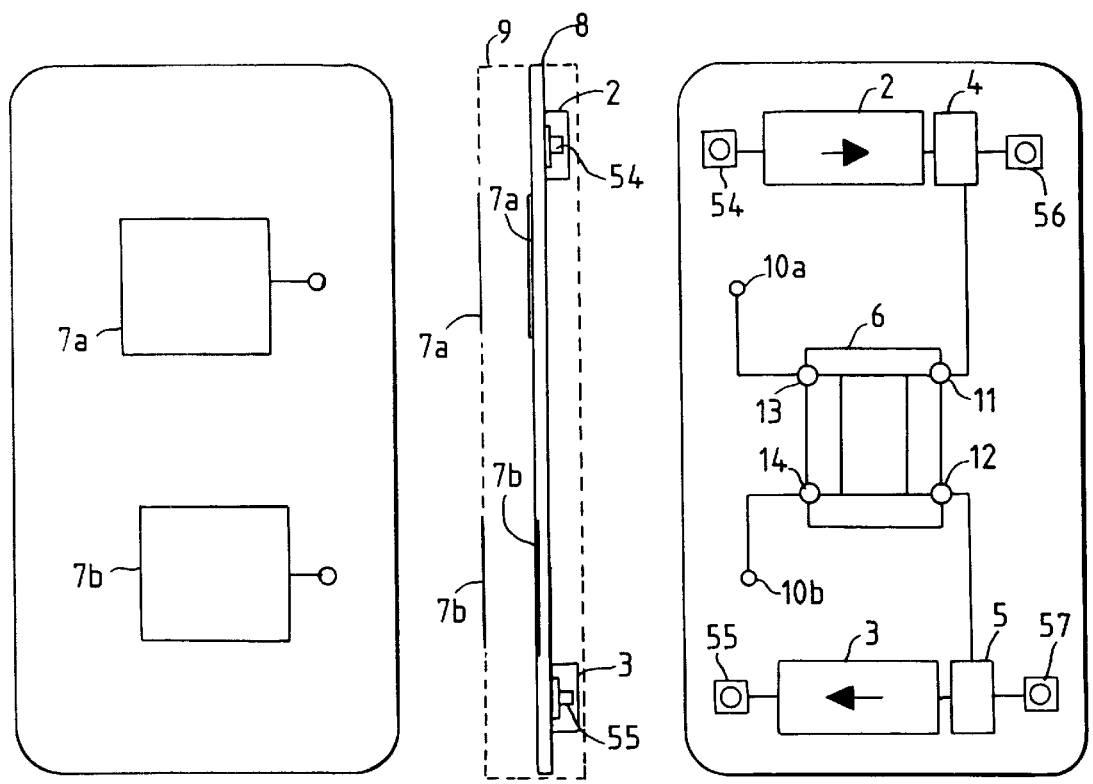
FIG. 9 is another configuration of a distributed antenna constructed in accordance with the invention.

With reference to FIG. 9, another type of the distributed antenna 1 constructed in accordance with this invention is described, and said combiner 6 is constructed with a 0 degree or 180 degree hybrid coupler 6, and said built-in antenna 7 is constructed by two patch antenna 7a and 7b with radiation elements 7a' and 7b'. By the above constructions, a wall mount type directional distributed antenna can be realized. If a 0 degree hybrid coupler 6 is adopted, a single pole directional distributed antenna 1 can be realized. If a 180 degree hybrid coupler 6 is adopted, two poles directional distributed antenna 1 can be realized.

The foregoing detailed description has been given for clearness of understanding only, and no unnecessary limitations should be understood therefrom, as modifications will be obvious to those skilled in the art.

What is claimed is:

1. A distributed antenna for use in digital mobile communication systems comprising:
   (1) at least one RF transmission means to couple RF signals receiving from and transmitting to a base station, wherein said RF signals are in the form of down-link RF signals, and up-link RF signals, respectively;
   (2) two divider means which divide the down-link RF signals and the up-link RF signals into more than two RF signal directions;
   (3) combiner means coupled to one of said RF signal directions from said divider means and including at least one transmitter and receiver pair to detect and convert said RF signals into base band signals and to modulate said base band signals into new RF signals by interconnecting said base band signals from said receiver to said transmitter to repeat the new RF signals to and from said divider means;
   (4) built-in antenna means coupled to said combiner means; and
   (5) at least one RF transmission means to couple another of said RF signal directions from said divider means with a next stage of said distributed antenna.

2. A distributed antenna as described in claim 1, wherein said distributed antenna comprises:
   (1) two isolated amplifier means coupled to said divider means and amplifying the down-link RF signals and the up-link RF signals transmitted to and from said base station;
   (2) a printed wire board on which said built-in antenna means are assembled; and
   (3) a plastic case including a shielding case portion to cover said printed wire board.

3. A distributed antenna according to claim 1, including an antenna coupler to couple said distributed antenna with said base station, said antenna coupler comprising:
   (1) antenna means to transmit and receive said RF signals to and from said base station;
   (2) two isolated amplifiers to amplify said down-link and said up-link RF signals; and
   (3) at least one RF transmission means to couple to said distributed antenna.

4. A distributed antenna according to claim 1, including an antenna coupler to couple said distributed antenna with an external base station, said antenna coupler comprising:
   (1) antenna means to transmit and receive said RF signals to and from said base station;
   (2) combiner and amplifier means including at least one transmitter and receiver pair to detect said RF signals into the base band signals and to modulate said base band signals into new RF signals by interconnecting said base band signals from said receiver to said transmitter to repeat the RF signals to and from said divider means; and
   (3) at least one RF transmission means to couple said distributed antenna.

5. A distributed antenna according to claim 4, wherein said distributed antenna includes frequency converting means in between the carrier frequency band of said RF signals transmitted to and received from said base station and the carrier frequency band of said RF signals transmitted to and received from said subscriber units.

6. A distributed antenna according to claim 3, including a loop-back tester to test said distributed antenna, said loop-back tester comprising;
   (1) at least one RF transmission cable to couple to said distributed antenna; and
   (2) at least one transmitter and receiver pair to detect a loop-back test command and to transmit a loop-back answering command.

* * * * *